US012642170B2

(12) United States Patent
Yamaoka et al.

(10) Patent No.: US 12,642,170 B2
(45) Date of Patent: Jun. 2, 2026

(54) PUSH POWER TOOL WITH CONVERTIBLE CHASSIS

(71) Applicant: Nanjing Chervon Industry Co., Ltd., Nanjing (CN)

(72) Inventors: Toshinari Yamaoka, Nanjing (CN); Kang Wang, Nanjing (CN); Huixing Fu, Nanjing (CN); Hao Wang, Nanjing (CN); Zhongji Xia, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 479 days.

(21) Appl. No.: 18/333,929

(22) Filed: Jun. 13, 2023

(65) Prior Publication Data

US 2024/0000006 A1     Jan. 4, 2024

(30) Foreign Application Priority Data

| | | | |
|---|---|---|---|
| Jun. 29, 2022 | (CN) | ......................... | 202210761105.3 |
| Jun. 29, 2022 | (CN) | ......................... | 202210784867.5 |
| Jun. 29, 2022 | (CN) | ......................... | 202221665203.9 |
| Jun. 29, 2022 | (CN) | ......................... | 202221715427.6 |

(51) Int. Cl.
| | |
|---|---|
| *A01D 34/74* | (2006.01) |
| *A01D 34/78* | (2006.01) |
| *A01D 34/81* | (2006.01) |
| *A01D 34/82* | (2006.01) |
| *A01D 69/02* | (2006.01) |
| *A01D 101/00* | (2006.01) |

(52) U.S. Cl.
CPC ............. *A01D 34/74* (2013.01); *A01D 34/78* (2013.01); *A01D 34/81* (2013.01); *A01D 34/824* (2013.01); *A01D 69/02* (2013.01); *A01D 2101/00* (2013.01)

(58) Field of Classification Search
CPC ........ A01D 34/54; A01D 34/74; A01D 34/78; A01D 34/81; A01D 67/00; A01D 69/02
See application file for complete search history.

(56) References Cited

U.S. PATENT DOCUMENTS

| | | |
|---|---|---|
| 4,149,362 A | 4/1979 | Haffner |
| 4,321,785 A * | 3/1982 | Kaland .................. A01D 34/74 |
| | | 56/17.2 |
| 4,942,726 A | 7/1990 | Bowditch |
| (Continued) | | |

FOREIGN PATENT DOCUMENTS

| | | |
|---|---|---|
| CN | 201199799 Y | 3/2009 |
| CN | 101790921 A | 5/2012 |
| (Continued) | | |

OTHER PUBLICATIONS

Office Action from Canadian application No. 3,204,568, dated Oct. 18, 2024, 4 pp.

*Primary Examiner* — Alicia Torres
(74) *Attorney, Agent, or Firm* — Greenberg Traurig, LLP

(57) ABSTRACT

A push power tool chassis accommodates at least part of a mowing element. An adjustment mechanism is used for adjusting the mowing height. The chassis has a first mounting portion for mounting a first gear plate, a second mounting portion for selectively mounting a second gear plate, and a third mounting portion for selectively mounting a connection mechanism for connecting a front wheel set to a rear wheel set.

17 Claims, 11 Drawing Sheets

(56)                    References Cited

U.S. PATENT DOCUMENTS 5,230,208 A  *   7/1993  Hess .................... A01D 34/74
                                                  172/395
2011/0239616  A1    10/2011  Shimozono
2012/0260619  A1    10/2012  Haraqia
2023/0049265  A1*    2/2023  Bullington ........... H01M 50/51

FOREIGN PATENT DOCUMENTS

CN        108055910  A    5/2018
CN        208759495  U    4/2019
CN        210183900  U    3/2020
CN        210694968  U    6/2020
CN        210746070  U    6/2020
CN        107529721  A    8/2020
CN        211671394  U    10/2020
CN        113329616  A    8/2021
CN        216698603  U    6/2022
CN        113226012  A    3/2023
DE     202021105544  U1   12/2021
EP          2649873  A1 *  10/2013    ............ A01D 34/74
WO       2008046289  A1    4/2008
WO       2016155559  A1    10/2016
WO       2020001637  A1    1/2020

* cited by examiner

Rear

Front

PUSH POWER TOOL WITH CONVERTIBLE CHASSIS

RELATED APPLICATION INFORMATION

This application claims the benefit under 35 U.S.C. § 119(a) of Chinese Patent Application No. 202210784867.5, filed on Jun. 29, 2022, Chinese Patent Application No. 202221665203.9, filed on Jun. 29, 2022, Chinese Patent Application No. 202221715427.6, filed on Jun. 29, 2022, and Chinese Patent Application No. 202210761105.3, filed on Jun. 29, 2022, which applications are incorporated herein by reference in their entirety.

BACKGROUND

A push power tool completes the specified operation by a push device and a traveling device. As a typical push tool, a mower is widely used at home and in hotels and other places where lawns and vegetation need to be mowed, and the mower can be used to quickly complete the mowing of lawns and vegetation, thereby greatly reducing the labor intensity of a worker and improving the operational efficiency of the worker.

Due to different usage scenarios, a user has different requirements for the function of the mower. For example, a household mower needs to be convenient to use and have a variety of functions. When the mowing height is adjusted, the operation steps need to be reduced. The dimension needs to be reduced during storage. Therefore, for ease of storage, the push device of the household mower is usually foldable, telescopic, or rotatable. To ensure the service life of a professional mower, a complex transmission and linkage mechanism is generally not provided, and more attention is paid to the usage stability and the service life rather than the reduction of the operation steps.

SUMMARY

A mower includes a body. The body includes a chassis accommodating at least part of a mowing element; wheel sets used for supporting the chassis and including a front wheel set and a rear wheel set; and an adjustment mechanism for adjusting the mowing height, where the adjustment mechanism includes an operating member for adjusting the mowing height and a gear plate for controlling the mowing height, and the gear plate includes a first gear plate. The chassis includes a first mounting portion for mounting the first gear plate, a second mounting portion for selectively mounting a second gear plate, and a third mounting portion for selectively mounting a connection mechanism for connecting the front wheel set to the rear wheel set.

In some examples, when the first gear plate and the connection mechanism are mounted on the chassis, the chassis is adapted in a first use mode within a first type of mower; and when the first gear plate and the second gear plate are mounted on the chassis, the chassis is adapted in a second use mode within a second type of mower.

In some examples, in the case where the chassis is in the first use mode, the adjustment mechanism further includes a first operating member mating with the first gear plate, and the first operating member drives the connection mechanism.

In some examples, in the case where the chassis is in the second use mode, the adjustment mechanism further includes a first operating member mating with the first gear plate and a second operating member mating with the second gear plate, the first operating member is used for adjusting the height of a side of the chassis, and the second operating member is used for adjusting the height of the other side of the chassis.

In some examples, the body is configured to be adapted to any one of a first handle mechanism and a second handle mechanism, and the first handle mechanism is different from the second handle mechanism.

In some examples, the chassis is provided with a handle mounting portion, and the handle mounting portion is used for selectively mounting one of the first handle mechanism and the second handle mechanism.

In some examples, when the first handle mechanism is mounted on the chassis, the chassis is adapted in a first use mode within a first type of mower; and when the second handle mechanism is mounted on the chassis, the chassis is adapted in a second use mode within a second type of mower.

In some examples, at least one of the first handle mechanism and the second handle mechanism is capable of rotating about a first rotation axis relative to the body.

In some examples, the body further includes a motor driving, through a drive shaft, the mowing element for mowing, where the drive shaft rotates about a central axis, and a first accommodation cavity for accommodating and mounting the motor is formed on the chassis; a battery pack for supplying power to the motor; and a body housing including a battery holder and connected to the chassis.

In some examples, the weight of the chassis is at least 15% of the weight of the body.

In some examples, the chassis is made of at least one of aluminum and plastic.

In some examples, at least two coupling portions for detachably coupling battery packs to the body housing and at least two guide portions for guiding the battery packs to be coupled to the at least two coupling portions along plugging directions are disposed in the battery holder, an included angle between each of the plugging directions and a direction of the central axis is an acute angle, and along the direction of the central axis, the battery packs partially overlap the motor.

In some examples, the body further includes a control mechanism for controlling the motor, the body housing or the chassis is formed with or connected to a second accommodation cavity for accommodating the control mechanism, and the second accommodation cavity is disposed behind the battery holder.

In some examples, the rear wheel set includes two rear wheels rotating about a second rotation axis, the front wheel set includes two front wheels rotating about a third rotation axis, and the ratio of the distance h between the center of gravity of the chassis and the second rotation axis to the distance g between the center of gravity of the chassis and the third rotation axis is greater than or equal to 0.8 and less than or equal to 1.2.

In some examples, the distance h between the center of gravity of the chassis and the second rotation axis is greater than 320 mm.

A push power tool includes a chassis accommodating at least part of a working element for implementing a function of the push power tool; where the chassis is configured to be adapted to at least one of a first handle mechanism and a second handle mechanism, and the first handle mechanism is different from the second handle mechanism.

A chassis is adapted to a mower, where the chassis accommodates at least part of a mowing element for performing a mowing operation, and the chassis includes a first use mode adapted to a first type of mower and a second use mode adapted to a second type of mower; where when the chassis is adapted to the first type of mower, a first type of adjustment mechanism for adjusting the mowing height is mounted on the chassis; and when the chassis is adapted to the second type of mower, a second type of adjustment mechanism for adjusting the mowing height is mounted on the chassis.

In some examples, each of the first type of mower and the second type of mower adapted to the chassis includes wheel sets used for supporting the chassis and including a front wheel set and a rear wheel set; the first type of adjustment mechanism of the first type of mower includes a first gear plate and a connection mechanism connecting the front wheel set to the rear wheel set, and the first gear plate is connected to the connection mechanism to adjust the mowing height; and the second type of adjustment mechanism of the second type of mower includes the first gear plate and a second gear plate, where the first gear plate controls the height of a side of the chassis, and the second gear plate controls the height of the other side of the chassis.

In some examples, the chassis includes a first mounting portion for mounting the first gear plate, a second mounting portion for selectively mounting the second gear plate, and a third mounting portion for selectively mounting the connection mechanism for connecting the front wheel set to the rear wheel set.

In some examples, the chassis is provided with a handle mounting portion, where when the chassis is in the first use mode, the handle mounting portion is adapted to a first handle mechanism of the first type of mower; and when the chassis is in the second use mode, the handle mounting portion is adapted to a second handle mechanism of the second type of mower.

In some examples, each of the first handle mechanism and the second handle mechanism includes a handle portion for the user to hold and a connecting rod for connecting the handle portion to the body, where the handle portion is provided along a first direction, the connecting rod is provided along a second direction, and the connecting rod included in at least one of the first handle mechanism and the second handle mechanism is telescopic along the second direction.

In some examples, a handle connector is disposed at a mounting position, and the connecting rod of the first handle mechanism or the connecting rod of the second handle mechanism is capable of being rotatably connected to the handle connector.

In some examples, the motor is connected to or formed with a fan.

In some examples, the second accommodation cavity is formed with or communicates with an air inlet, and the first accommodation cavity is formed with or communicates with an air outlet; when the motor is configured to rotate, the fan forms heat dissipation air, and the heat dissipation air can flow from the second accommodation cavity to the first accommodation cavity through a duct and eventually out of the air outlet.

In some examples, a first plane passes through the center of the battery holder and is parallel to the plugging direction, and along a pushing direction of the push power tool, the battery pack includes a front portion located on the front side of the first plane and a rear portion located on the rear side of the first plane; along the direction of the central axis, the lowest point of the front portion of the battery pack is lower than the highest point of the motor.

In some examples, at least two body portions are arranged at intervals along a horizontal direction on the body housing, one coupling portion is disposed in the body portion, and at least two battery packs are plugged into the at least two body portions in a one-to-one correspondence.

In some examples, the battery packs include a first battery pack and a second battery pack, the body portions include a first body portion located in front of the central axis and a second body portion located behind the central axis, the first battery pack is plugged into the first body portion, and the second battery pack is plugged into the second body portion.

In some examples, the first battery pack is plugged into the first body portion along a first plugging direction, an included angle between the first plugging direction and the direction of the central axis is a first acute angle, the second battery pack is plugged into the second body portion along a second plugging direction, and an included angle between the second plugging direction and the direction of the central axis is a second acute angle.

In some examples, the distance d between the first battery pack and the second battery pack is greater than 30 mm.

In some examples, the distance g between the center of gravity of the chassis and the third rotation axis is greater than 320 mm.

In some examples, the linear velocity M of a blade tip of the mowing element is greater than or equal to 2900 m/min and less than or equal to 5791 m/min.

In some examples, the chassis is a non-uniform-thickness piece, and the weight of the chassis is greater than or equal to 8 kg and less than or equal to 11 kg.

In some examples, the body further includes a grass frame mounted to the rear of the body housing, and a grass catcher bag is detachably connected to the grass catcher; the grass catcher bag is configured such that when the grass catcher bag is full of grass clippings, the distance between the center of gravity of the push power tool and the forwardmost end of the push power tool is at most 50% of the total length of the push power tool.

In some examples, the distance e between a motor control board and a central axis a is less than 260 mm.

In some examples, the distance f between a power supply control board and the central axis a is less than 350 mm.

In some examples, the air inlet is formed on at least part of a structure of the body housing located between the battery holder and the second accommodation cavity, the heat dissipation air flows into the second accommodation cavity through the air inlet, the air outlet is formed on at least part of a structure of the chassis, and the heat dissipation air flows out of the first accommodation cavity through the air outlet.

In some examples, multiple air inlets are provided and arranged in a shape of a fence.

In some examples, at least part of the chassis is a metal piece, the second accommodation cavity for accommodating an electronic assembly is further included, and the electronic assembly is provided with a heat sink portion at least partially in contact with the metal piece of the chassis.

DETAILED DESCRIPTION

Figure 1:
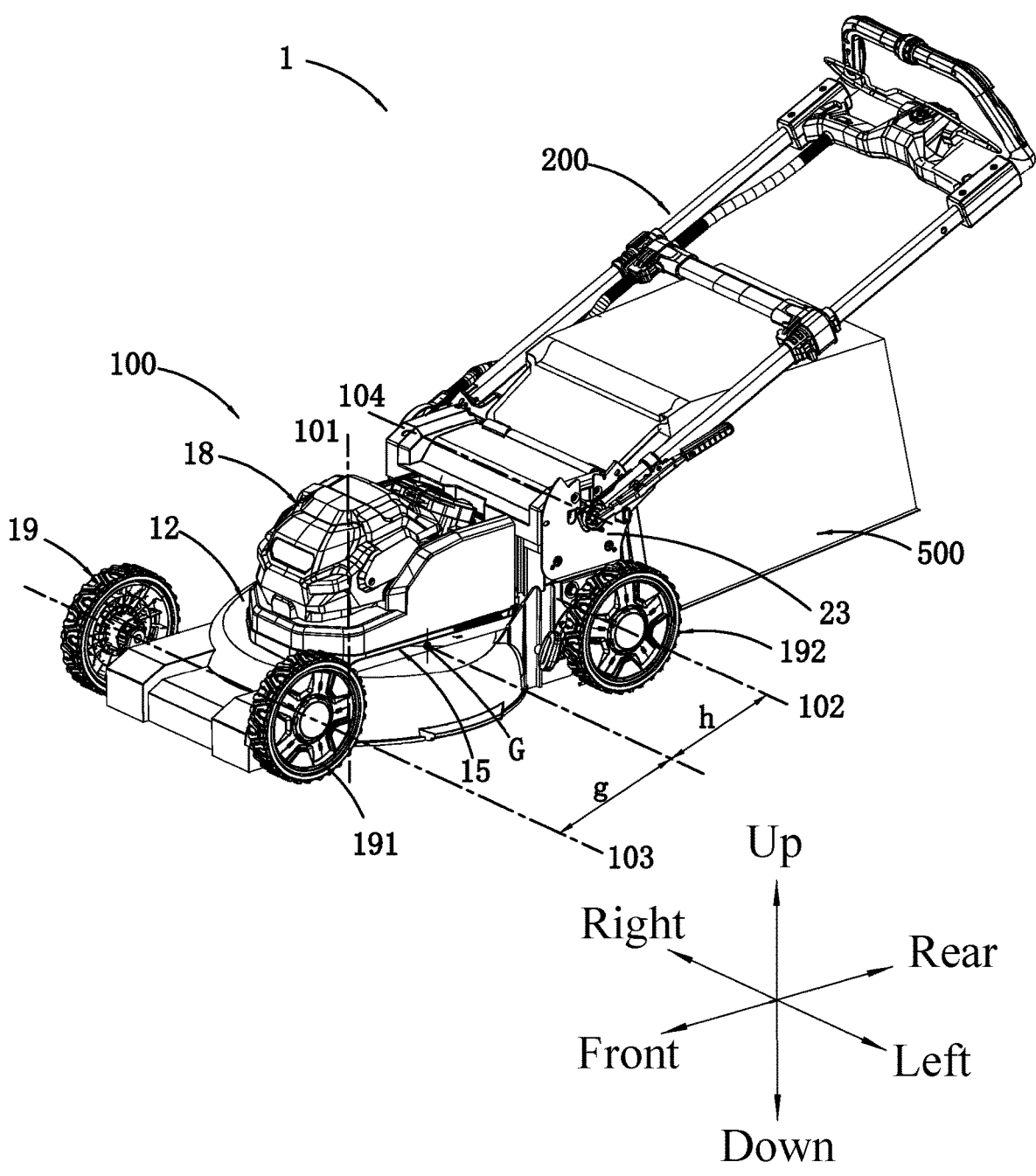
FIG. 1 is a structural view of a mower according to an example of the present application.

The present disclosure is further described hereinafter in detail in conjunction with drawings and examples. It is to be understood that the examples described herein are intended to explain the present disclosure and not to limit the present disclosure. Additionally, it is to be noted that for ease of description, only part, not all, of the structures related to the present disclosure are illustrated in the drawings.

In the description of the present disclosure, unless otherwise expressly specified and limited, the term "connected to each other", "connected", or "secured" is to be construed in a broad sense, for example, as securely connected, detachably connected, or integrated; mechanically connected or electrically connected; directly connected to each other or indirectly connected to each other via an intermediary; or internally connected between two components or an interaction relation between two components. For those of ordinary skill in the art, specific meanings of the preceding terms in the present disclosure may be understood based on specific situations.

In the present disclosure, unless otherwise expressly specified and limited, when a first feature is described as "above" or "below" a second feature, the first feature and the second feature may be in direct contact or be in contact via another feature between the two features. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

In the description of this example, orientations or position relationships indicated by terms "above", "below", "right", and the like are based on the drawings. These orientations or position relations are intended only to facilitate the description and simplify operations and not to indicate or imply that a device or element referred to must have such particular orientations or must be configured or operated in such particular orientations. Thus, these orientations or position relations are not to be construed as limiting the present disclosure. In addition, the terms "first" and "second" are used only to distinguish between descriptions and have no special meaning.

Figure 9:
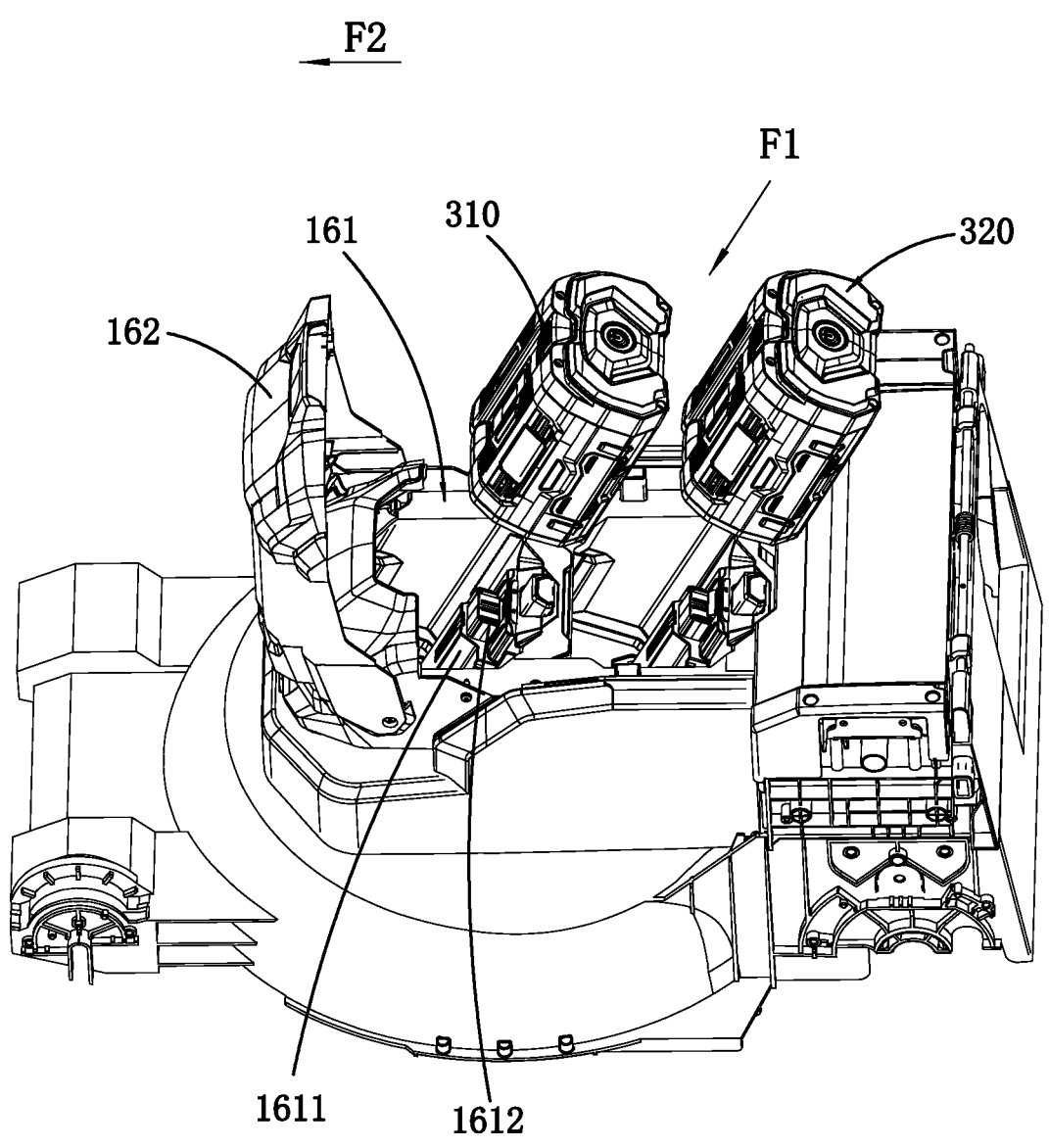
FIG. 9 is an exploded view of a body of a mower according to an example of the present application.

The present application provides a push power tool. When pushed by the hands of a user, the power tool operates and can implement a working function of a working element. As shown in FIG. 1, in this example, the push power tool is a push mower 1. The working element is a mowing element 119 for mowing the grass as shown in FIG. 9. In this example, the mowing element 119 is a cutting blade. The number of cutting blades does not affect the substance of the present application.

The mower 1 may be operated by the user to mow lawns and other vegetation. In other examples, the push power tool may be another power tool, such as a snow thrower and a cart.

Figure 2:
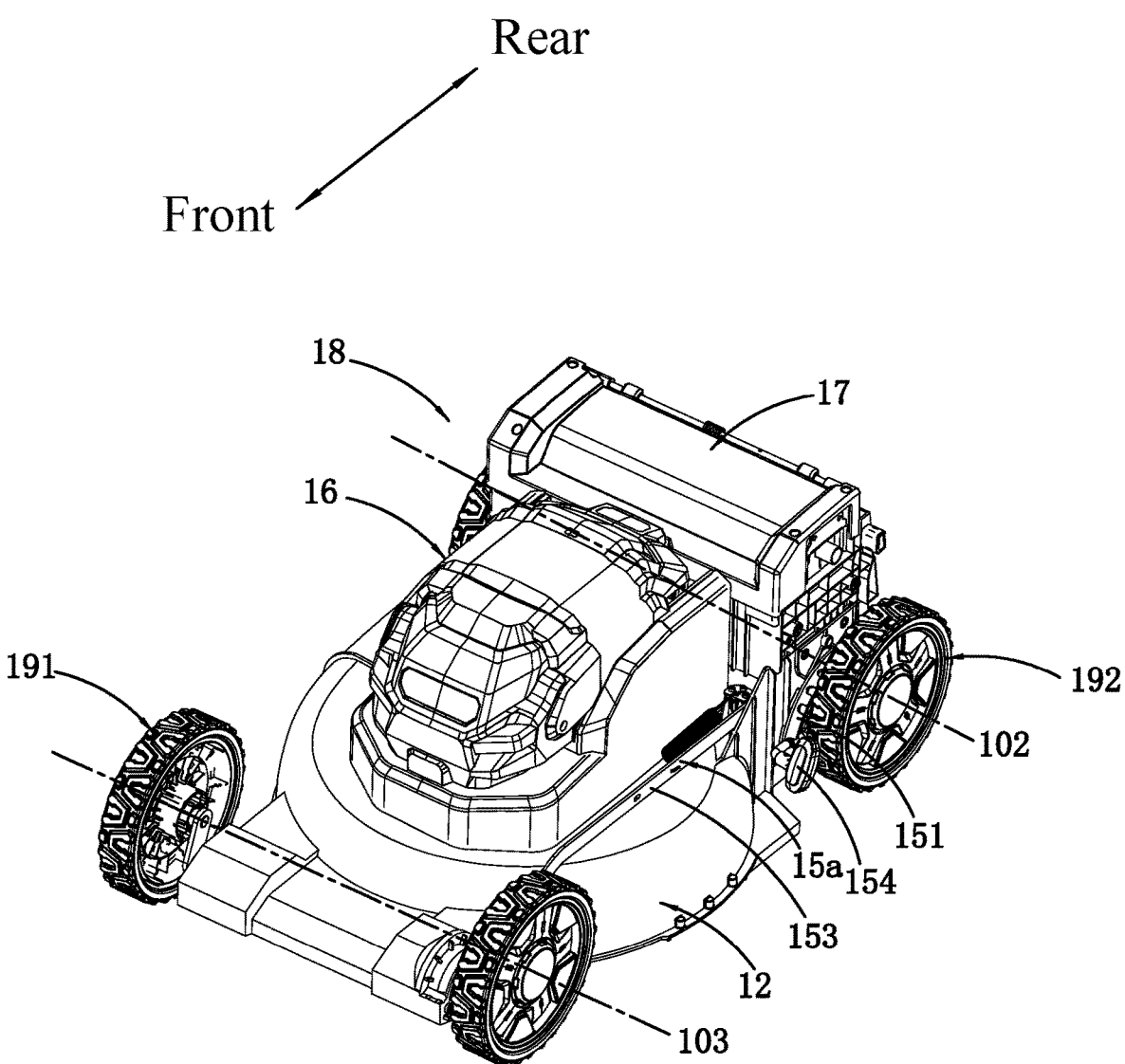
FIG. 2 is a structural view of a body of a mower according to an example of the present application.
Figure 8:
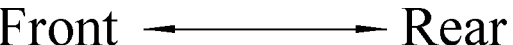
FIG. 8 is a sectional view of a body of a mower according to an example of the present application.
Figure 8:
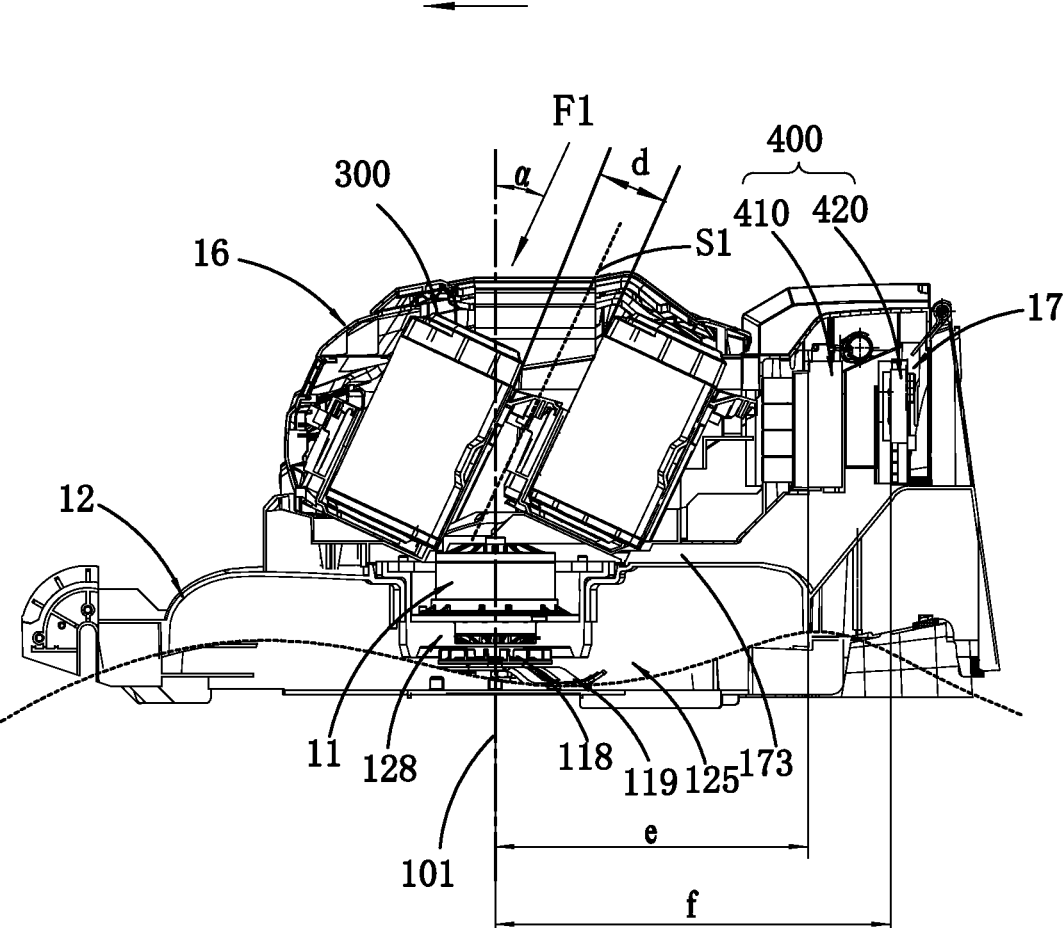

As shown in FIG. 1, the mower 1 includes a body 100, an operating mechanism 200, and a grass catcher bag 500. As shown in FIGS. 1, 2, and 8, the body 100 includes a body housing 18, a motor 11, a chassis 12, wheel sets 19, an adjustment mechanism 15, a power supply 300, and a control mechanism 400. The body housing 18 is used for mounting the power supply 300 and the control mechanism 400. The chassis 12 is mainly used for mounting and carrying the motor 11, the mowing element 119, wheel sets 19, and the adjustment mechanism 15. The motor 11 includes a drive shaft (not shown in the figure) rotating about a central axis 101. Through the drive shaft (not shown in the figure), the motor 11 drives the mowing element 119 to rotate and perform a mowing operation. In this example, the motor 11 is specifically configured to be an electric motor, and the electric motor 11 is used below instead of the motor, but it does not serve as a limitation of the present disclosure.

The wheel sets 19 are used for supporting the chassis 12. The wheel sets 19 include a front wheel set 191 and a rear wheel set 192.

The adjustment mechanism 15 is used for adjusting the mowing height.

The power supply 300 is used for supplying power to the electric motor 11. The control mechanism 400 forms an electrical connection or signal connection with the electric motor 11, and the control mechanism 400 is used for controlling the power output of the mower 1. In this example, the power supply 300 is a battery pack. The battery pack mates with the corresponding power supply circuit and supplies power to the mower 1. It is to be understood by those skilled in the art that the power supply 300 is not limited to the scenario where the battery pack is used, and the power may be supplied to the corresponding component in the body through mains power or an alternating current power supply in conjunction with the corresponding rectifier circuit, filter circuit, and voltage regulator circuit. The battery pack 300 is used below instead of the power supply, but it does not serve as a limitation of the present disclosure.

The battery pack 300 may be a lithium battery pack, a solid-state battery pack, or a pouch battery pack. In some examples, the nominal voltage of the battery pack is greater than or equal to 36 V and less than or equal to 120 V. In some examples, the voltage of the battery pack 300 is greater than or equal to 36 V and less than or equal to 80 V. In some examples, the voltage of the battery pack 300 is greater than or equal to 48 V and less than or equal to 80 V.

As shown in FIG. 1, the operating mechanism 200 is connected to the rear of the body 100 and pushed by the hands of the user so as to operate the mower 1.

Optionally, the grass catcher bag 500 is connected to the rear of the body 100 and located below the operating mechanism 200. The grass catcher bag 500 is used for accommodating grass clippings generated by the mower 1 during the mowing operation.

In the related art, one of the mowers is a household mower (used for non-profit purposes) according to different scenarios in which the mower is used. The household mower is generally used in a home yard. A professional (commercial) mower is also included. The professional mower has higher requirements for the service life and stability. Among the actual products, the adjustment mechanism 15 and the operating mechanism 200 of the household mower are designed differently from the adjustment mechanism 15 and the operating mechanism 200 of the professional mower.

Alternatively, to adapt to different user habits, adjustment mechanisms 15 and operating mechanisms 200 in different household mowers or different professional mowers are designed differently.

Figure 3:
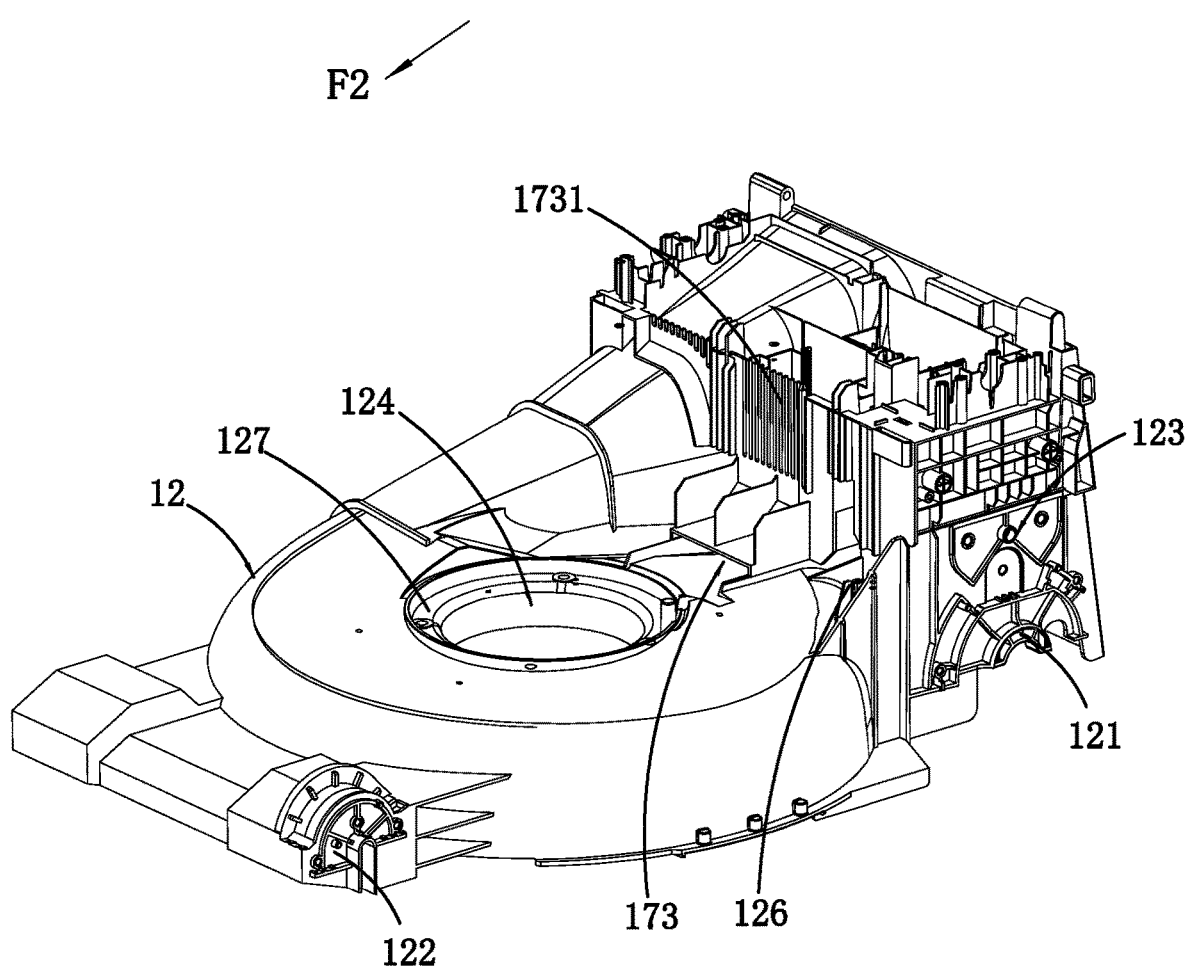
FIG. 3 is a partial structural view of a chassis of a mower according to an example of the present application.
Figure 4:
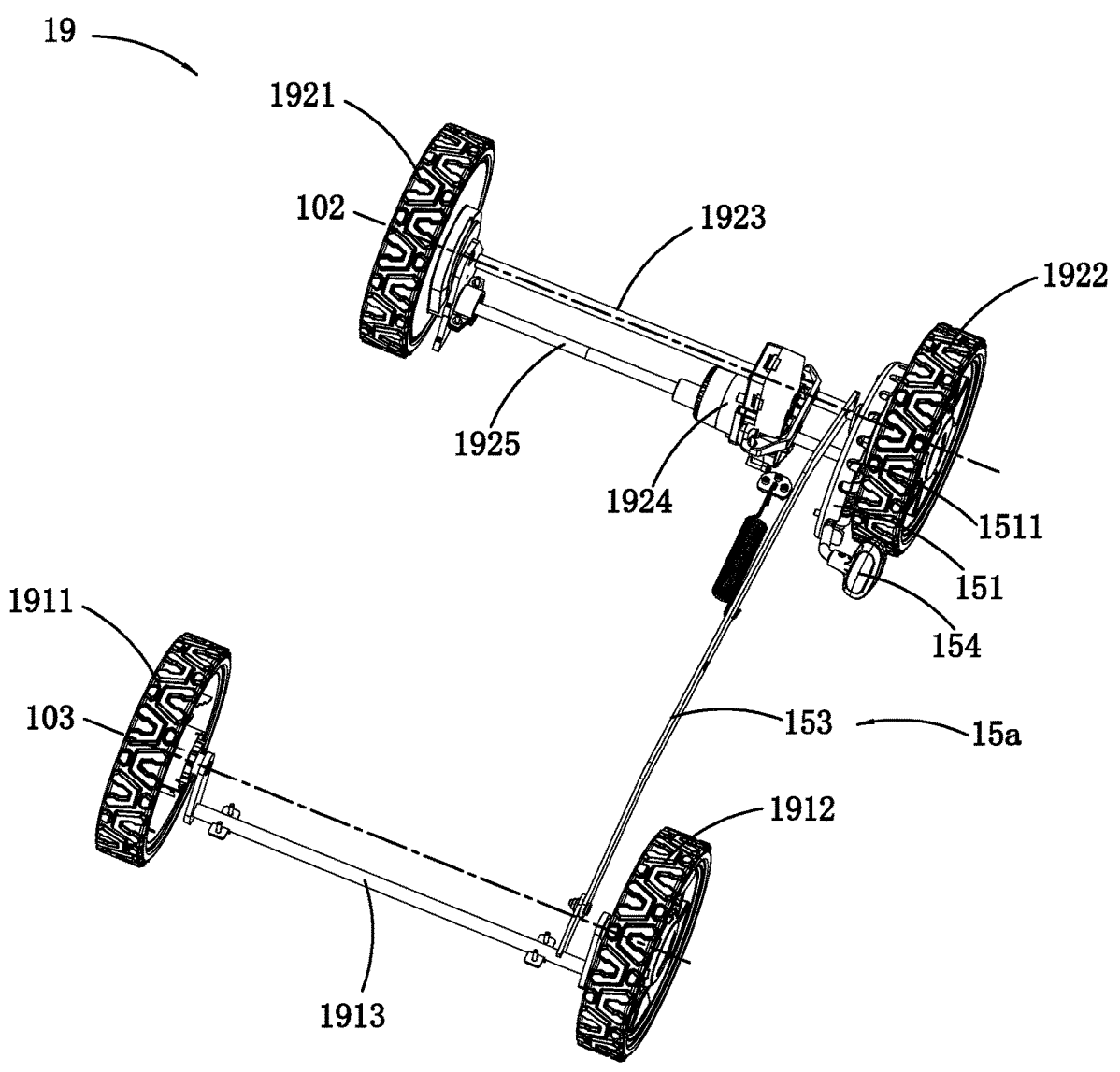
FIG. 4 is a schematic view of wheel sets and a first adjustment mechanism of a mower according to an example of the present application.

As shown in FIGS. 2 to 4, a first type of adjustment mechanism 15a of a first type of mower is shown. The first type of adjustment mechanism 15a includes a first gear plate 151 and a connection mechanism 153. In this example, the connection mechanism 153 is specifically a connection rod, and two ends of the connection rod are separately connected to the front wheel set 191 and the rear wheel set 192. The first type of adjustment mechanism 15a further includes a first operating member 154, where the first operating member 154 mates with the first gear plate 151 to control the height of the chassis. The first operating member 154 drives the connection mechanism 153, and the connection mechanism 153 is used for driving the front wheel set 191 and the rear wheel set 192 to move relative to the chassis, so as to adjust the mowing height. In an example, the first type of adjustment mechanism 15a may be a height adjustment mechanism suitable for the household mower.

Figure 5:
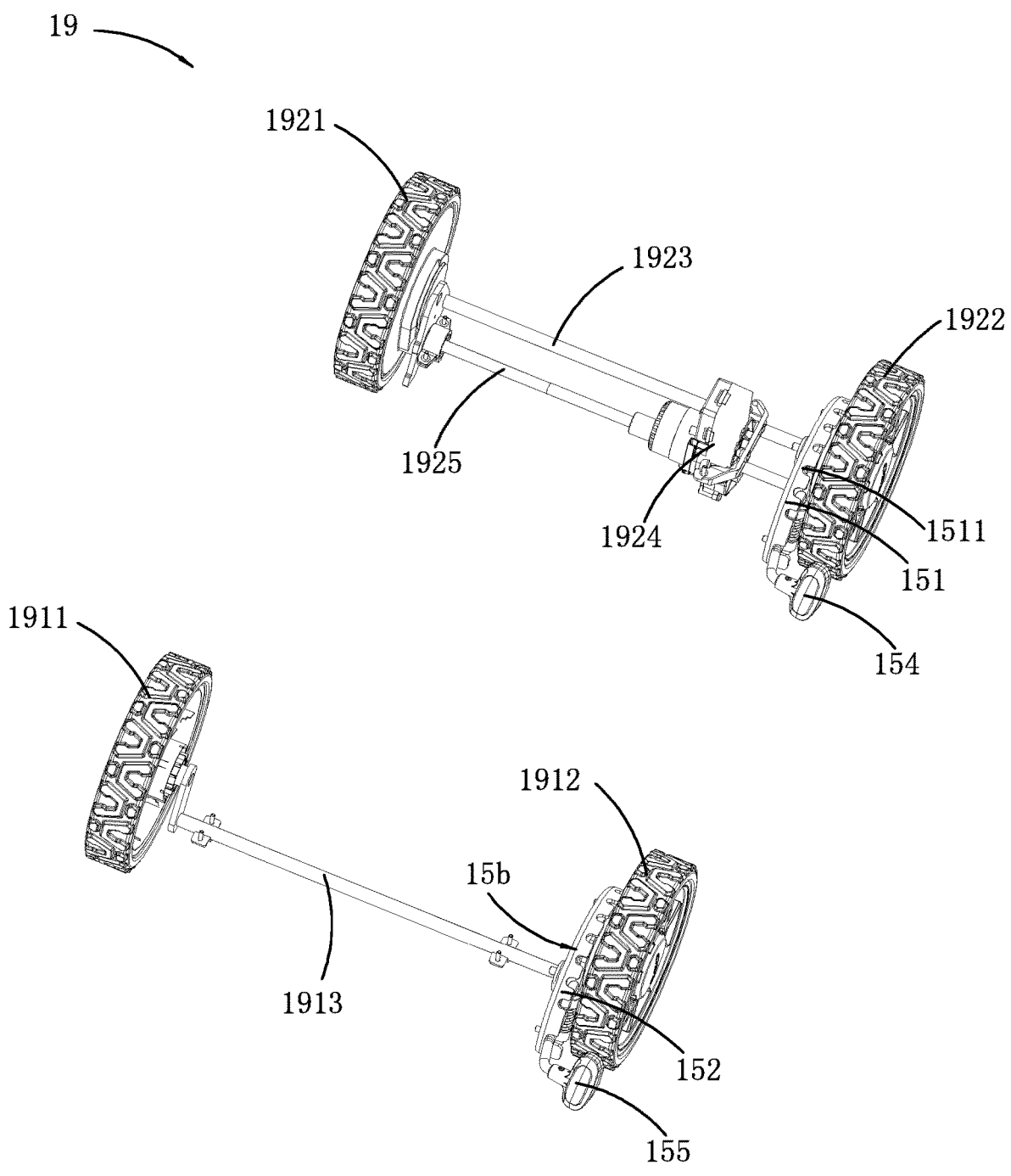
FIG. 5 is a schematic view of wheel sets and a second adjustment mechanism of a mower according to an example of the present application.

As shown in FIGS. 3 and 5, a second type of adjustment mechanism 15b of a second type of mower is shown. The second type of adjustment mechanism 15b includes the first gear plate 151 and a second gear plate 152. The first gear plate 151 controls the height of a side of the chassis, and the second gear plate 152 controls the height of the other side of the chassis. In this example, the first gear plate 151 controls the height of the rear side of the chassis. The second gear plate 152 controls the height of the front side of the chassis. The second type of adjustment mechanism 15b further includes the first operating member 154 mating with the first gear plate 151 and a second operating member 155 mating with the second gear plate 152. In an example, the second type of adjustment mechanism 15b may be a height adjustment mechanism suitable for the professional mower.

As shown in FIGS. 2 to 5, since the structures of the first gear plate 151 and the second gear plate 152 are basically the same, the structures of the first operating member 154 and the second operating member 155 are basically the same. For ease of description of structural features, the first gear plate 151 and the first operating member 154 are described as examples.

The first gear plate 151 is formed with a gear slot 1511, and the first operating member 154 passes through the gear slot 1511 from a side of the first gear plate 151 to the other side of the first gear plate 151. In other words, the first operating member 154 partially protrudes to the gear slot 1511. The gear slot 1511 includes multiple inwardly recessed gear grooves and connecting walls. The gear groove can accommodate the first operating member 154, and the sidewalls of the gear groove can limit the movement of the first operating member 154. When the first operating member 154 is located in different gear grooves, the mower 1 is limited to different mowing heights. The gear plate is an arc-shaped plate structure. In some examples, gear marks are provided on the gear plate. Since in the field of mowers, the working principle and specific technical solutions in which the handle and gear plate are used for adjusting the cutting height are fully disclosed to those skilled in the art, the detailed description is omitted here for the brevity of the description.

In this example, the chassis 12 includes a first mounting portion 121, a second mounting portion 122, and a third mounting portion 126. The first mounting portion 121 is used for mounting the first gear plate 151, and the second mounting portion 122 is used for selectively mounting the second gear plate 152. The third mounting portion 126 is used for selectively mounting the connection mechanism 153 for connecting the front wheel set 191 to the rear wheel set 192. In this manner, different mounting portions are selectively used so that the chassis 12 can be adapted to the first type of adjustment mechanism 15a and the second type of adjustment mechanism 15b and thus adapted to the first type of mower and the second type of mower.

In this example, the chassis 12 includes a first use mode and a second use mode. As shown in FIGS. 1 and 9, in the first use mode, the chassis 12 is adapted to the first type of adjustment mechanism 15a, that is to say, the first gear plate 151 is mounted on the first mounting portion 121 of the chassis 12, and the connection mechanism 153 is mounted on the third mounting portion 126 of the chassis 12. In the second use mode, the chassis 12 is adapted to the second type of adjustment mechanism 15b, that is to say, the first gear plate 151 is mounted on the first mounting portion 121 of the chassis 12, and the second gear plate 152 is mounted on the second mounting portion 122 of the chassis 12. In this manner, the chassis 12 can be adapted to a variety of different height adjustment mechanisms, thereby adapting to a variety of mowers 1 in different scenarios and has high versatility, a wide application scope, good platforming, and relatively low cost.

Figure 6:
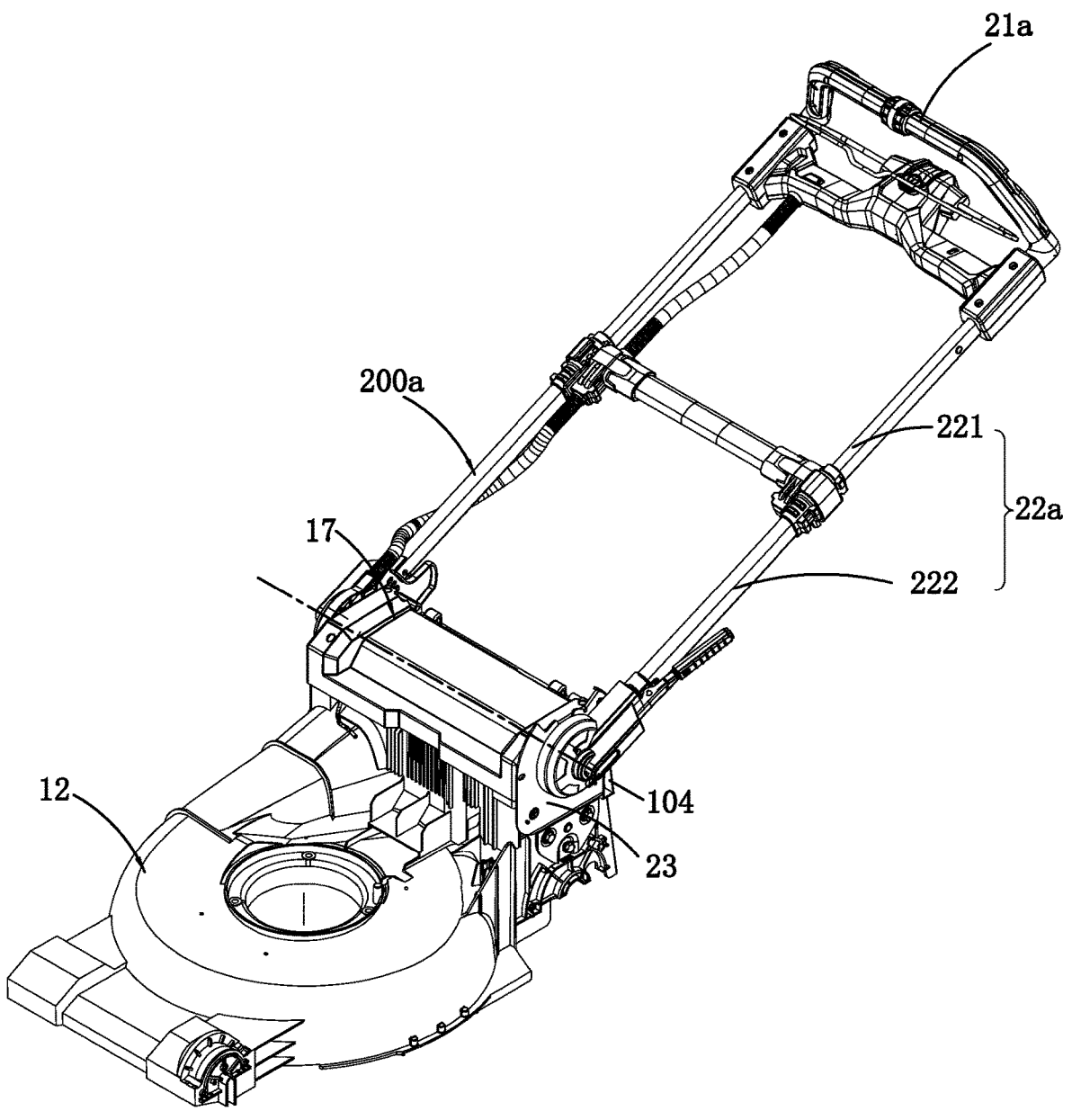
FIG. 6 is a schematic view illustrating that a chassis of a mower is adapted to a first handle mechanism according to an example of the present application.
Figure 7:
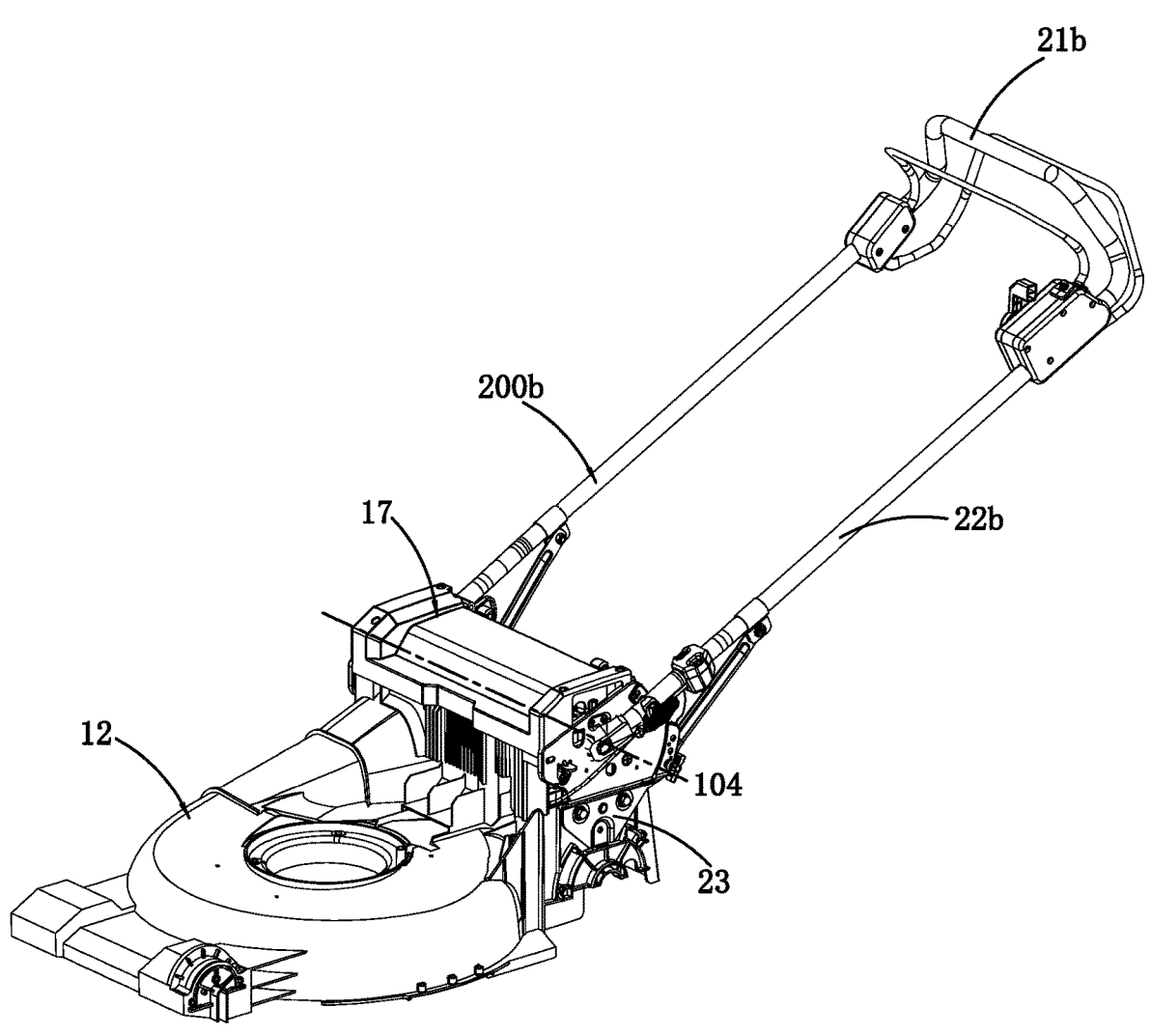
FIG. 7 is a schematic view illustrating that a chassis of a mower is adapted to a second handle mechanism according to an example of the present application.

As shown in FIGS. 1, 6, and 7, the operating mechanism 200 is specifically a first handle mechanism 200a in the first type of mower. The operating mechanism 200 is specifically a second handle mechanism 200b in the second type of mower. The first handle mechanism 200a and the second handle mechanism 200b herein refer to two handle mechanisms with different structures, the specific structures are not limited, and the handle mechanism on the existing mower 1 can be used in this example.

To adapt to different usage scenarios, at least one of the first handle mechanism 200a and the second handle mechanism 200b can rotate about a first rotation axis 104. The length of at least one of the first handle mechanism 200a and the second handle mechanism 200b can be changed. For example, the first handle mechanism 200a is a household handle, and the household handle is configured to be telescopic for easy storage so as to reduce the space occupied when idle. The second handle mechanism 200b is a professional handle, and the professional handle is configured to be a non-telescopic structure to ensure the service life.

Optionally, one of the first handle mechanism 200a and the second handle mechanism 200b is mounted on the chassis 12. In this example, a handle mounting portion 123 is disposed on the chassis 12. When the chassis 12 is in the first use mode, the handle mounting portion 123 is adapted to the first handle mechanism 200a of the first type of mower. When the chassis 12 is in the second use mode, the handle mounting portion 123 is adapted to the second handle mechanism 200b of the second type of mower. The first handle mechanism 200a and the second handle mechanism 200b each include a handle connector 23. The handle connector 23 is adapted and mounted to the handle mounting portion 123. In some examples, the handle connector 23 is a plate of iron or other material. In this manner, the replacement efficiency of the handle mechanisms can be improved and installation misalignment when the user replaces the handle mechanism can be avoided. Therefore, the chassis 12 can be adapted to a variety of mowers 1 in different scenarios and has high versatility, a wide application scope, and good platforming.

As shown in FIGS. 6 and 7, the first handle mechanism 200a includes a handle portion 21a for the user to hold and a connecting rod 22a for connecting the handle portion 21a to the body 100, the second handle mechanism 200b includes a handle portion 21b for the user to hold and a connecting rod 22b for connecting the handle portion 21b to the body 100, the handle portion 21a and the handle portion 21b extend along a first direction, and the connecting rod 22a and the connecting rod 22b extend along a second direction. Optionally, the first direction is perpendicular to the second direction to improve the aesthetics of the handle mechanism and the ease of assembly. In some more specific examples, the connecting rod 22a or the connecting rod 22b included in at least one of the first handle mechanism 200a and the second handle mechanism 200b is telescopic along the second direction. In this example, as shown in FIG. 6, the first handle mechanism 200a is telescopic along the second direction and includes a first rod 221 and a second rod 222 that are sleeved, the first rod 221 and the second rod 222 are telescopically connected, and the length of the first rod 221 and the second rod 222 can be changed by telescoping.

In this example, except for the adjustment mechanism 15 and the operating mechanism 200, the remaining components of the first type of mower and the second type of mower are the same. Therefore, the remaining components are revealed without making a distinction between the first type of mower and the second type of mower, and the first type of mower and the second type of mower are referred to by the mower 1.

As shown in FIG. 2, the body housing 18 is a shell structure extending along a front and rear direction. The chassis 12 is also disposed along the front and rear direction. The body housing 18 is the shell structure above the chassis 12. In this example, the body housing 18 and the chassis 12 are two independent housings and are fixed through a connector. In other alternative examples, the body housing 18 and the chassis 12 are an integrally formed member, as long as the requirements for mounting other functional pieces can be satisfied. In this example, the body housing 18 is a housing formed by plastic processing. In other alternative examples, the body housing 18 is a housing formed by stamping sheet metal parts or a die-cast metal housing.

As shown in FIGS. 3 and FIGS. 8 to 12, a first accommodation cavity 124 for accommodating the electric motor 11 is formed on the chassis 12. An accommodation portion 125 for accommodating the mowing element 119 is also formed on the chassis 12. In this example, the accommodation portion 125 communicates with the first accommodation cavity 124, and the accommodation portion 125 is below the first accommodation cavity 124. It is to be understood that the first accommodation cavity 124 and the accommodation portion 125 form a stepped hole, the first accommodation cavity 124 has a relatively small dimension and is located above the accommodation portion 125, and the accommodation portion 125 has a relatively large dimension and is located below the first accommodation cavity 124. When the electric motor 11 is disposed in the first accommodation cavity 124, a motor housing of the electric motor 11 abuts against a connecting surface 127. The drive shaft of the electric motor 11 extends along the central axis 101. The mowing element 119 is connected to the drive shaft. In this example, the mowing element 119 includes at least one mowing blade arranged circumferentially around the drive shaft. Driven by the electric motor 11, the mowing blades can rotate around the central axis 101 and cut the vegetation.

A battery holder 16 for mounting the battery pack 300 is formed in the body housing 18, and the battery holder 16 is located above the first accommodation cavity 124 along a vertical direction.

As shown in FIGS. 3 and 8, the battery holder 16 includes a body portion 161 formed in the body housing 18 and a battery holder cover 162 that can be opened and closed and connected to the body portion 161. The body portion 161 is used for accommodating the battery pack 300. After the battery pack 300 is placed inside the body portion 161, the battery holder cover 162 is detachably connected to an opening of the battery holder 16 so that the battery holder cover 162 protects the battery pack 300. The battery pack 300 placed in the battery holder 16 can be electrically connected to the electric motor 11 to supply power to the electric motor 11.

At least two body portions 161 are spaced apart from each other in the battery holder 16 along a horizontal direction, where the horizontal direction refers to a front and rear horizontal direction along which a pushing direction F2 is located. The body portions 161 include a first body portion 161a located in front of the central axis 101 and a second body portion 161b located behind the central axis 101. Since the structures of the first body portion 161a and the second body portion 161b are basically the same, for ease of description of structural features, the first body portion 161a is described as an example.

As shown in FIGS. 3, 8, and 9, the first body portion 161a includes a coupling portion 1612 and a guide portion 1611. The coupling portion 1612 is connected to the first body portion 161a. The coupling portion 1612 is used for detachably connecting the battery pack 300 within the battery holder 16. The guide portion 1611 is used for guiding the battery pack 300 to be coupled to the coupling portion 1612 along a plugging direction F1. In this example, an included angle α between the plugging direction F1 and a direction of the central axis 101 is an acute angle. Along the direction of the central axis 101, the battery pack 300 partially overlaps the electric motor 11. In this example, the guide portion 1611 is a guide ramp formed within the battery holder 16. The included angle α between the plugging direction F1 and the direction of the central axis 101 may be understood as an included angle between the guide ramp and the central axis 101. The guide portion 1611 mates with a guide chute disposed on the battery pack 300. The battery pack 300 slides into the body portion 161 along the guide ramp. The coupling portion 1612 includes a spring engagement groove provided in the battery holder 16, where the spring engagement groove can engage with an engagement portion on the battery pack 300 to fix and limit the battery pack 300. The coupling portion 1612 further includes positive and negative terminals electrically connected to the corresponding interfaces of the battery pack, thereby achieving an electrical connection. In this example, at least two coupling portions 1612 and at least two guide portions 1611 are provided in the battery holder 16.

In the mower 1, the included angle α between the plugging direction F1 and the direction of the central axis 101 of the drive shaft is configured to be an acute angle, and the battery pack 300 partially overlaps the electric motor 11 along the direction of the central axis 101 so that the utilization of the internal space of the body housing 18 is improved. It is convenient for the user to apply a force when plugging and unplugging the battery pack 300, thereby improving the user experience. It is to be noted that the magnitude of the included angle α between the plugging direction F1 and the direction of the central axis 101 is not specifically limited in the present application. The specific angular values of the included angle α in an angular range of acute angles are all protected by the present application.

In this example, a plane passing through the center of the body portion 161 and parallel to the plugging direction F1 is defined as a first plane S1. Along the forward pushing direction F2 of the push power tool, the battery pack 300 includes a front portion located on the front side of the first plane S1 and a rear portion located on the rear side of the first plane S1. In some examples, the lowest point of the front portion of the battery pack 300 is lower than the highest point of the electric motor 11 along the direction of the central axis 101, thereby making full use of the space of the body housing 18 and the chassis 12 in the vertical direction, further improving the structural compactness of the components within the body 100, and further improving the space utilization.

In some examples, when one battery pack 300 is provided, the battery pack 300 is located in front of the central axis 101 along the forward pushing direction F2 of the push power tool. Since the battery pack 300 is disposed in front of the central axis 101 on the body housing 18, the center moves forward and the structure is more stable. Therefore, the battery pack 300 is disposed in front of the central axis 101, thereby facilitating the operation and ensuring the structural stability of the whole body 100. In this case, the battery pack 300 includes only the front portion located on the front side of the first plane S1. The lowest point of the battery pack 300 is lower than the highest point of the electric motor 11.

In this example, at least two battery packs 300 are provided. As shown in FIGS. 3 and 7, the battery packs 300 include a first battery pack 310 and a second battery pack 320. The first battery pack 310 and the second battery pack 320 are used as a whole, and the first plane S1 is located between the first battery pack 310 and the second battery pack 320. The front portion of the battery packs 300 located on the front side of the first plane S1 is the first battery pack 310. The rear portion of the battery packs 300 located on the rear side of the first plane S1 is the second battery pack 320. In this example, the lowest point of the first battery pack 310 is lower than the highest point of the electric motor 11.

In this example, the first battery pack 310 is inserted into the first body portion 161a, and the second battery pack 320 is inserted into the second body portion 161b. The first battery pack 310 is inserted into the first body portion 161a along a first plugging direction, and an included angle between the first plugging direction and the direction of the central axis 101 is a first acute angle. The second battery pack 320 is inserted into the second body portion 161b along a second plugging direction, and an included angle between the second plugging direction and the direction of the central axis 101 is a second acute angle. It is to be noted that the first acute angle and the second acute angle may be configured to be the same or different according to the requirements. In some specific examples, the first acute angle and the second acute angle are the same so as to reduce the difficulty of designing and manufacturing the two body portions 161 of the body housing 18. In some other examples, the first acute angle and the second acute angle may be unequal so that display portions of end surfaces of the two battery packs 300 (the first battery pack 310 and the second battery pack 320) can face an operator, which is convenient for the user to plug and unplug the battery packs 300.

In this example, the lowest point of the first battery pack 310 is located in the same plane as the lowest point of the second battery pack 320 along an up and down direction. The highest point of the first battery pack 310 is located in the same plane as the highest point of the second battery pack 320. In this manner, the two battery packs 300 (the first battery pack 310 and the second battery pack 320) are arranged side by side in space for a more compact layout.

In some alternative examples, the first battery pack and the second battery pack do not overlap along the direction of the central axis 101. In this manner, the first battery pack 310 and the second battery pack 320 can be prevented from interfering with each other in the direction of the central axis 101, and the phenomenon in which the two battery packs 300 must be plugged and unplugged according to a preset order is avoided, which is conducive to ensuring the flexibility of plugging and unplugging the battery packs 300.

With continued reference to FIG. 8, the distance d between the first battery pack 310 and the second battery pack 320 is greater than 30 mm. In this manner, the distance between the two battery packs 300 (the first battery pack 310 and the second battery pack 320) can be prevented from being too small, and the following is avoided: the thickness of the structure between the first battery pack 310 and the second battery pack 320 on the body housing 18 is too small to carry the weight of the two battery packs 300. It is to be explained that the distance d between the first battery pack 310 and the second battery pack 320 is the minimum distance between the rear side surface of the first battery pack 310 and the front side surface of the second battery pack.

As shown in FIGS. 8 to 12, the control mechanism 400 is used for controlling the power output of the electric motor 11. A maintenance compartment 17 is formed on or connected to the body housing 18 or the chassis 12. The maintenance compartment 17 includes a second accommodation cavity 171 for accommodating the control mechanism 400. The second accommodation cavity 171 is provided with an opening, and the opening can be opened and closed and connected to a second accommodation cavity cover 172. The second accommodation cavity cover 172 is opened to reveal the opening. At this time, the control mechanism 400 can be mounted into or removed from the second accommodation cavity 171. After the control mechanism 400 is mounted into the second accommodation cavity 171, the second accommodation cavity cover 172 is closed so that the opening is closed and the control mechanism 400 is protected. In this example, the second accommodation cavity 171 is formed on the body housing 18, and along the pushing direction F2 of the mower 1, the second accommodation cavity 171 is disposed behind the first accommodation cavity 124 and the battery holder 16.

The control mechanism 400 generates a large amount of heat in the working process. If the heat is accumulated in the second accommodation cavity 171 and cannot be dissipated quickly, the temperature in the second accommodation cavity 171 is too high to enable the control mechanism 400 to work normally. In this example, as shown in FIGS. 3 and 6, the first accommodation cavity 124 communicates with the second accommodation cavity 171 through a duct 173. The electric motor 11 is connected to or formed with a fan 118. When the electric motor 11 rotates, the fan 118 forms a heat dissipation air path for dissipating heat from the electric motor. The fan 118 is located at an outlet end of the heat dissipation air path. Since the fan 118 is disposed in the first accommodation cavity 124, the outlet of the heat dissipation air path is formed at the opening of the first accommodation cavity 124. The electric motor 11 and the second accommodation cavity 171 are all located at the inlet end of the heat dissipation air path. Therefore, the electric motor 11 drives the fan 118 to rotate, forming an air path from the second accommodation cavity 171 through the duct 173 and finally out of the first accommodation cavity 124 to dissipate heat from the second accommodation cavity 171.

In the mower 1, the first accommodation cavity 124 communicates with the second accommodation cavity 171 by using the duct 173. The heat dissipation air path formed by the rotation of the fan 118 on the electric motor 11 is used for dissipating heat from the second accommodation cavity 171. In this manner, the heat dissipation air path not only dissipates heat from the electric motor but also dissipates heat from the control mechanism 400. Therefore, the heat dissipation effect and efficiency are improved. It is to be noted that the duct 173 here may be a dummy structure such as a hole formed on the body housing 18 and the chassis 12 or a solid structure such as a pipe. In this example, the chassis 12 and the maintenance compartment 17 form the duct 173 with a tubular structure.

An air inlet 1731 is formed on at least part of a structure of the body housing 18 located between the battery holder 16 and the second accommodation cavity 171. The heat dissipation air flows into the second accommodation cavity 171 through the air inlet 1731. Multiple air inlets 1731 are provided and arranged in a shape of a fence, so as to increase the intake air volume and improve the heat dissipation effect.

Figure 10:
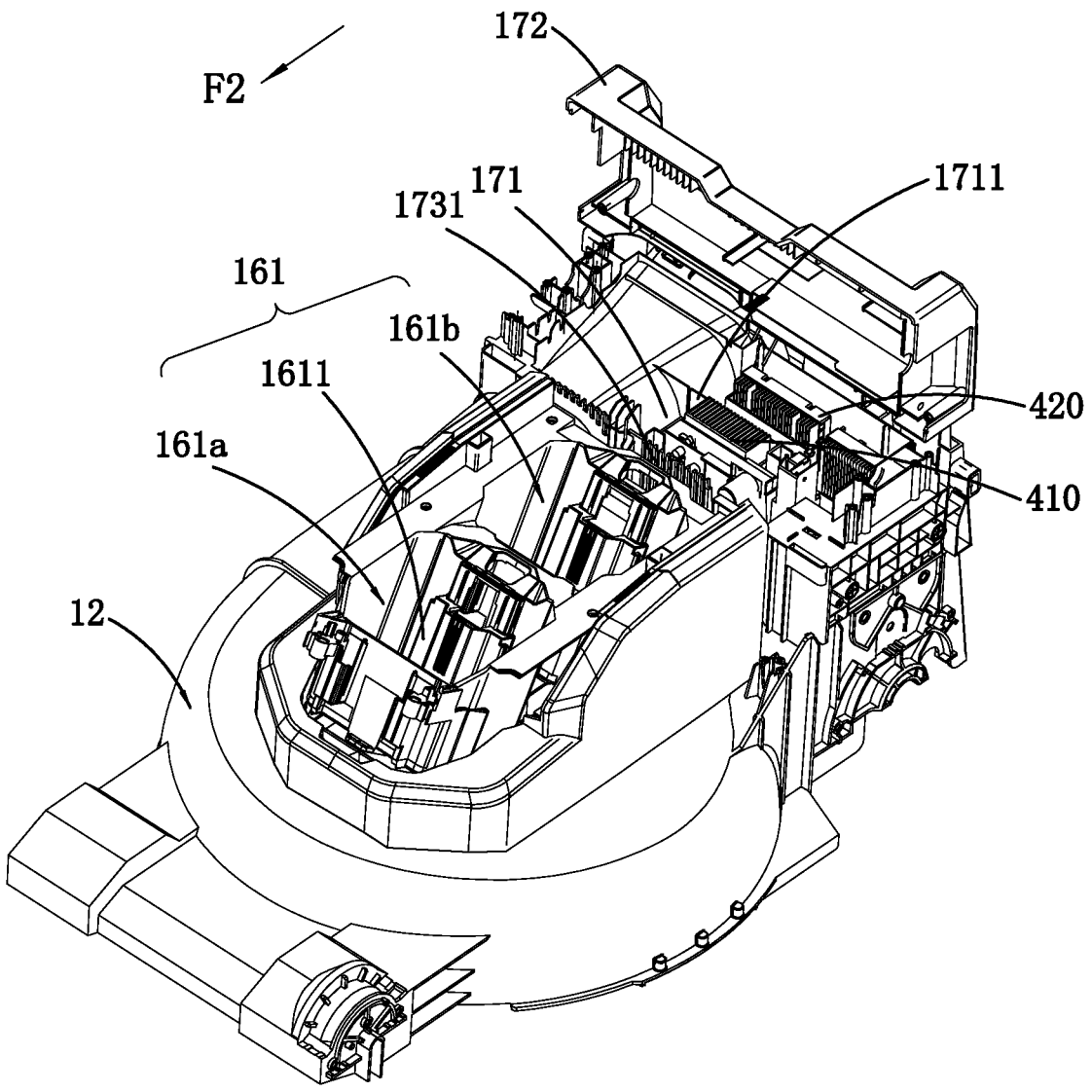
FIG. 10 is a partial structural view of a body housing and a chassis of a mower according to an example of the present application.
Figure 11:
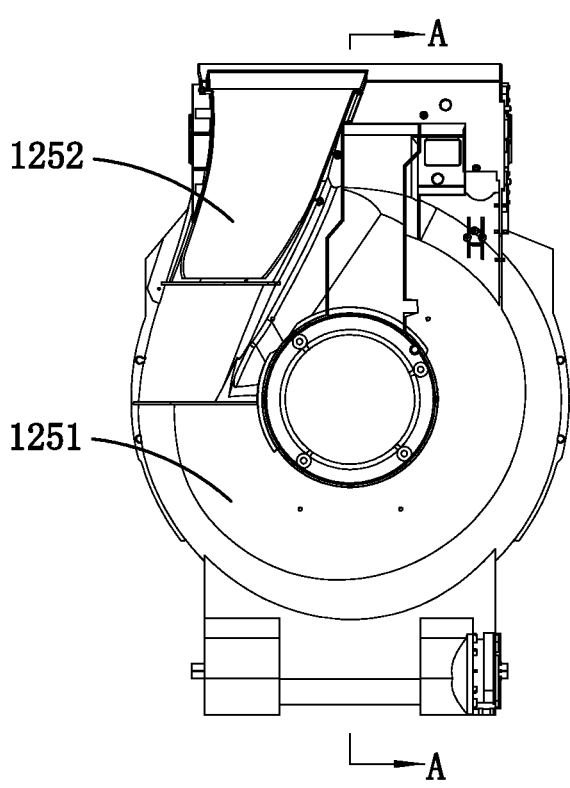
FIG. 11 is a top view of a chassis of a mower according to an example of the present application.
Figure 12:
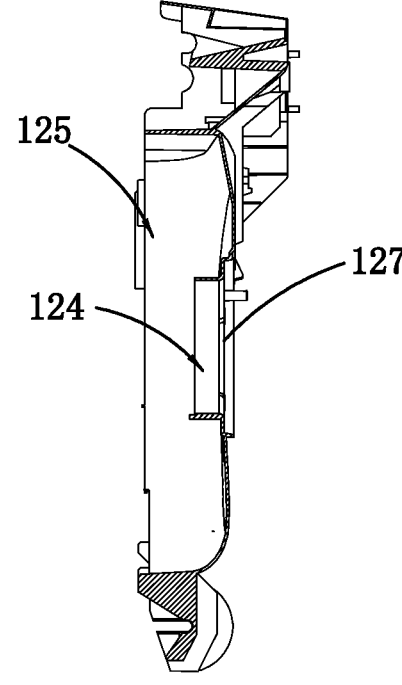
FIG. 12 is a sectional view taken along an A-A direction of FIG. 7.

As shown in FIGS. 8 and 10, the control mechanism 400 includes an electric motor control board 410 electrically connected to the electric motor 11 and a power supply control board 420 electrically connected to the power supply 300. The electric motor control board 410 is disposed near the air inlets 1731. The heat dissipation air passes through the electric motor control board 410 and the power supply control board 420 in sequence. In this manner, the electric motor control board 410 and the power supply control board 420 can be dissipated at the same time so that the heat dissipation efficiency is higher and the heat dissipation effect is better.

A partition 1711 is formed in or connected to the second accommodation cavity 171. The partition 1711 divides the second accommodation cavity 171 into a first cavity and a second cavity communicating with each other. Along the pushing direction F2 of the mower 1, the first cavity is located in front of the second cavity. The heat dissipation air flows out after passing through the first cavity, the second cavity, the duct 173, and the first accommodation cavity 124 in sequence. The electric motor control board 410 and the power supply control board 420 are located in the first cavity and the second cavity, respectively.

As shown in FIG. 8, in some examples, the distance e between the electric motor control board 410 and the central axis 101 is less than 260 mm. Too large a distance e results in too long a path of the duct 173, affecting the heat dissipation effect, which is not conducive to machining the duct 173 on the chassis 12. As shown in FIG. 3, in some examples, the distance f between the power supply control board 420 and the central axis 101 is less than 350 mm. Too large a distance f results in too long a path of the duct 173, affecting the heat dissipation effect, which is not conducive to machining the duct 173 on the chassis 12.

In this example, at least part of the chassis 12 is made of metal material. The control mechanism 400 includes a heat sink portion. In this example, the heat sink portion includes a heat sink or a heat sink plate. The heat sink portion is at least partially in contact with the metal material part of the chassis 12. Due to the high heat transfer efficiency of metal, at least part of the chassis 12 is made of the metal material, and the part made of the metal material is in direct contact with the heat sink portion of the control mechanism 400, thereby further improving the heat dissipation efficiency and effect.

It is to be noted that, in some examples, the electric motor 11, the battery pack 300, and the control mechanism 400 may be integrated in one housing to form a powerhead, a powerhead cavity with a relatively large dimension for accommodating the powerhead is formed in the body housing 18, and the powerhead can be inserted into the powerhead cavity along an installation direction. The installation direction here may be parallel to the central axis.

As shown in FIGS. 1 to 5, the wheel sets 19 are used for supporting the chassis 12. The wheel sets 19 include the front wheel set 191 and the rear wheel set 192. The front wheel set 191 includes a first front wheel 1911 and a second front wheel 1912. The first front wheel 1911 and the second front wheel 1912 are disposed at the front end of the chassis 12. The first front wheel 1911 is rotatably disposed on the left side of the front end of the chassis 12, the second front wheel 1912 is rotatably disposed on the right side of the front end of the chassis 12, and the first front wheel 1911 and the second front wheel 1912 are connected by a front axle 1913. The front axle 1913 is a U-shaped structure and is rotatably connected to the chassis 12. A rotation axis of the first front wheel 1911 and the second front wheel 1912 relative to the front axle 1913 does not coincide with a rotation axis of the front axle 1913 relative to the chassis 12. The first front wheel 1911 and the second front wheel 1912 rotate about a third rotation axis 103. The front axle 1913 rotates about the third rotation axis 103, forms an eccentric structure, and then drives the chassis 12 to be displaced along the direction of the central axis. That is, the position of the chassis 12 relative to the first front wheel 1911 and the second front wheel 1912 is adjusted.

The rear wheel set 192 includes a first rear wheel 1921 and a second rear wheel 1922. The first rear wheel 1921 and the second rear wheel 1922 are disposed at the rear end of the chassis 12 and rotatably connected by a rear axle 1923. The first rear wheel 1921 is rotatably disposed on the left side of the rear end of the chassis 12, and the second rear wheel 1922 is rotatably disposed on the right side of the rear end of the chassis 12. A rotation axis of the first rear wheel 1921 and the second rear wheel 1922 relative to the rear axle 1923 does not coincide with a rotation axis of the rear axle 1923 relative to the chassis 12. The first rear wheel 1921 and the second rear wheel 1922 rotate about a second rotation axis 102. The rear axle 1923 is rotatably connected to the chassis 12. The rear axle 1923 rotates about the second rotation axis 102, forms an eccentric structure, and then drives the chassis 12 to be displaced along the direction of the central axis. That is, the position of the chassis 12 relative to the first rear wheel 1921 and the second rear wheel 1922 is adjusted.

In this example, the rear wheel set 192 further includes a rear wheel drive motor 1924 and a rear wheel drive shaft 1925. The rear wheel drive shaft 1925 connects the first rear wheel 1921 to the second rear wheel 1922. The rear wheel drive motor 1924 is provided to enable the mower to have a self-propelled function. When the mower implements the self-propelled function and the user needs to mow the grass, the user just needs to stand on the rear side of the mower 1 and follow the mower 1 to travel. The mower 1 is driven by the rear wheel drive motor 1924 to move forward automatically, and the user does not need to manually push the mower 1 to travel on the ground. Such an operation makes the user save more effort and improves the working efficiency.

With continued reference to FIG. 1, the grass catcher bag 500 is used for collecting grass clippings cut by a cutting element. As the number of collected grass clippings increases, the weight in the grass catcher bag 500 becomes larger and larger. Moreover, since the grass catcher bag 500 is disposed at the rear of the body 100, the center of gravity of the entire mower 1 shifts backward as the number of grass clippings collected by the grass catcher bag 500 increases, causing the mower 100 to tip over backward easily. To prevent the mower 1 from tipping over, in some specific examples, the weight of the chassis 12 is at least 15% of the weight of the body 100.

In the push power tool, the weight of the chassis 12 is configured to be at least 15% of the weight of the body 100 so that the chassis 12 has a larger weight, the center of gravity of the push power tool is more forward, the push power tool is less likely to tip over in all use modes, and the user's feeling of use and safety performance are improved.

In this example, the chassis 12 is a disc-shaped structure made of at least one of aluminum and plastic. In addition to aluminum and plastic, the chassis 12 may be made of other denser materials, so as to make the chassis 12 have a larger weight for the same volume, increase the ratio of the weight of the chassis 12 to the weight of the whole mower 1, cause the center of gravity of the mower 1 to be as forward as possible, and prevent the mower 1 from tipping over when the grass catcher bag 500 is full of grass clippings. In this example, the chassis 12 is made of die-cast aluminum.

At the same time, due to the increased weight of the chassis 12, the strength of the chassis 12 increases accordingly. In the existing art, when the mowing element cuts vegetation, due to the insufficient strength of the chassis, the cutting speed of the mowing element is limited. In the example of the present application, due to the increased strength of the chassis 12, the linear velocity M of a blade tip of the mowing element 119 is greater than or equal to 2900 m/min and less than or equal to 5791 m/min.

In some examples, as shown in FIG. 1, the first rear wheel 1921 and the second rear wheel 1922 rotate about the second rotation axis 102, and the distance h between the center of gravity G of the chassis 12 and the second rotation axis 102 is greater than 320 mm. In some examples, the first front wheel 1911 and the second front wheel 1912 rotate about the third rotation axis 103, and the distance g between the center of gravity G of the chassis 12 and the third rotation axis 103 is greater than 320 mm. In some examples, the ratio of the distance h between the center of gravity G of the chassis 12 and the second rotation axis 102 to the distance g between the center of gravity G of the chassis 12 and the third rotation axis 103 is greater than or equal to 0.8 and less than or equal to 1.2. For example, the ratio may be 0.9, 1, or 1.1, so as to ensure that the center of gravity of the chassis 12 is in a center region between the front wheel set 191 and the rear wheel set 192, thereby avoiding the occurrence of tipping over backward.

In some examples, the chassis 12 is a non-uniform-thickness piece, and the weight of the chassis 12 is greater than or equal to 8 kg and less than or equal to 11 kg. For example, the weight of the chassis 12 may be 8 kg, 9 kg, 10 kg, or 11 kg. As shown in FIGS. 7 and 8, an orifice 1251 is formed in the chassis 12, and the weight of material required to make the orifice 1251 is 60% of the weight of the same material required to make the chassis 12. It is to be understood that the orifice 1251 is a part of the accommodation portion 125 close to the mowing element 119, the accommodation portion 125 includes the orifice 1251 and a grass discharge channel 1252, and the orifice 1251 accommodates the mowing element 119. When the mowing element 119 cuts vegetation, the rotation of the mowing element 119 generates airflow in the orifice 1251, the cut vegetation is guided by the airflow in the orifice to flow, and the vegetation flows from the orifice 1251 to the grass discharge channel 1252 and then into the grass catcher bag 500. It is to be understood that the mowing element 119 rotates to form a cutting radius and an inner wall of the orifice 1251 is a circular contour with a radius slightly greater than the cutting radius.

In some examples, the body 100 further includes a grass frame (not shown in the figure) mounted to the rear of the body housing 18, and the grass catcher bag 500 is detachably connected to the grass frame. When the grass catcher bag 500 is full of grass clippings, the distance between the center of gravity of the mower 1 and the forwardmost end of the mower 1 is at most 50% of the total length of the mower 1. In this manner, it can be ensured that the center of gravity of the mower 1 is located in the front half of the mower 1, thereby completely preventing the mower 1 from tipping over backward.

What is claimed is:

1. A mower, comprising:
a body, wherein the body comprises:
a chassis accommodating at least part of a mowing element and having a first use mode adapted to a first type of mower and a second use mode adapted to a second type of mower; and
wheel sets used for supporting the chassis and comprising a front wheel set and a rear wheel set;
wherein, in the first use mode a first type of adjustment mechanism for adjusting a mowing height is mounted on the chassis, in the second use mode a second type of adjustment mechanism for adjusting the mowing height is mounted on the chassis, the first type of adjustment mechanism comprises a first gear plate and a connection mechanism connecting the front wheel set to the rear wheel set with the first gear plate connected to the connection mechanism to adjust the mowing height, the second type of adjustment mechanism comprises the first gear plate and a second gear plate with the first gear plate controlling a height of a side of the chassis and the second gear plate controlling a height of another side of the chassis, and the chassis comprises a first mounting portion for mounting the first gear plate, a second mounting portion for selectively mounting the second gear plate, and a third mounting portion for selectively mounting the connection mechanism.

2. The mower of claim 1, wherein, in the first use mode, an operating member is configured to mate with the first gear plate and drive the connection mechanism to move.

3. The mower of claim 1, wherein, in the second use mode, a first operating member is configured to mate with the first gear plate, a second operating member is configured to mate with the second gear plate, the first operating member is used for adjusting the height of the side of the chassis, and the second operating member is used for adjusting the height of the another side of the chassis.

4. The mower of claim 1, wherein the body is configured to be adapted to one of a first handle mechanism and a second handle mechanism, and the first handle mechanism is different from the second handle mechanism.

5. The mower of claim 4, wherein the chassis is provided with a handle mounting portion, and the handle mounting portion is used for selectively mounting one of the first handle mechanism and the second handle mechanism.

6. The mower of claim 5, wherein when the first handle mechanism is mounted on the chassis, the chassis is in the first use mode and, when the second handle mechanism is mounted on the chassis, the chassis is in the second use mode.

7. The mower of claim 4, wherein at least one of the first handle mechanism and the second handle mechanism is capable of rotating about a first rotation axis relative to the body.

8. The mower of claim 1, wherein the body further comprises:

a motor having a drive shaft for driving the mowing element for mowing, wherein the drive shaft rotates about a central axis, and a first accommodation cavity for accommodating and mounting the motor is formed on the chassis;

a battery pack for supplying power to the motor; and a body housing comprising a battery holder and connected to the chassis.

9. The mower of claim 8, wherein a weight of the chassis is at least 15% of a weight of the body.

10. The mower of claim 9, wherein the chassis comprises aluminum.

11. The mower of claim 8, wherein at least two coupling portions for detachably coupling battery packs to the body housing and guide portions for guiding the battery packs to be coupled to the at least two coupling portions along a plugging direction are disposed in the battery holder, an included angle between the plugging direction and a direction of the central axis is an acute angle, and along the direction of the central axis, the battery packs partially overlap the motor.

12. The mower of claim 8, wherein the body further comprises a control mechanism for controlling the motor, the body housing or the chassis is formed with or connected to a second accommodation cavity for accommodating the control mechanism, and the second accommodation cavity is disposed at a rear side of the battery holder.

13. The mower of claim 1, wherein the rear wheel set comprises two rear wheels rotating about a second rotation axis, the front wheel set comprises two front wheels rotating about a third rotation axis, and a ratio of a distance h between a center of gravity of the chassis and the second rotation axis to a distance g between the center of gravity of the chassis and the third rotation axis is greater than or equal to 0.8 and less than or equal to 1.2.

14. The mower of claim 13, wherein the distance h between the center of gravity of the chassis and the second rotation axis is greater than 320 mm.

15. A chassis adapted to a mower, wherein the chassis accommodates at least part of a mowing element for performing a mowing operation, and the chassis comprises a first use mode adapted to a first type of mower and a second use mode adapted to a second type of mower;

wherein, when the chassis is adapted to the first type of mower, a first type of adjustment mechanism for adjusting a mowing height is mounted on the chassis; and when the chassis is adapted to the second type of mower, a second type of adjustment mechanism for adjusting the mowing height is mounted on the chassis;

wherein each of the first type of mower and the second type of mower adapted to the chassis comprises wheel sets used for supporting the chassis and comprising a front wheel set and a rear wheel set;

wherein the first type of adjustment mechanism of the first type of mower comprises a first gear plate and a connection mechanism connecting the front wheel set to the rear wheel set and the first gear plate is connected to the connection mechanism to adjust the mowing height; and the second type of adjustment mechanism of the second type of mower comprises the first gear plate and a second gear plate, the first gear plate controls a height of a side of the chassis, and the second gear plate controls a height of another side of the chassis.

16. The chassis of claim 15, comprising:

a first mounting portion for mounting the first gear plate;

a second mounting portion for selectively mounting the second gear plate; and a third mounting portion for selectively mounting the connection mechanism.

17. The chassis of claim 15, wherein the chassis is provided with a handle mounting portion, when the chassis is in the first use mode, the handle mounting portion is adapted to a first handle mechanism of the first type of mower, and, when the chassis is in the second use mode, the handle mounting portion is adapted to a second handle mechanism of the second type of mower.

* * * * *